United States Patent
Wang et al.

(10) Patent No.: US 9,215,239 B1
(45) Date of Patent: *Dec. 15, 2015

(54) MALWARE DETECTION BASED ON TRAFFIC ANALYSIS

(71) Applicant: Palo Alto Networks, Inc., Santa Clara, CA (US)

(72) Inventors: Xinran Wang, San Ramon, CA (US); Huagang Xie, Pleasanton, CA (US); Kyle Sanders, Sunnyvale, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 121 days.

This patent is subject to a terminal disclaimer.

(21) Appl. No.: 13/631,608

(22) Filed: Sep. 28, 2012

(51) Int. Cl.
*H04L 29/06* (2006.01)
*G06F 21/56* (2013.01)
*H04L 12/24* (2006.01)

(52) U.S. Cl.
CPC ............ *H04L 63/1408* (2013.01); *G06F 21/56* (2013.01); *H04L 41/14* (2013.01); *H04L 63/1433* (2013.01)

(58) Field of Classification Search
CPC ............ H04L 63/1416; H04L 63/1441; H04L 63/145; H04L 63/1408; H04L 63/1425; H04L 63/14; H04L 63/1466; H04L 63/1475; H04L 63/1433; H04L 63/20; H04L 41/147; G06F 21/56; G06F 21/55; G06F 21/566; G06F 21/554; G06F 21/564; G06F 21/561; G06F 2009/45587
USPC ..................................................... 726/22–25
See application file for complete search history.

(56) References Cited

U.S. PATENT DOCUMENTS

| | | |
|---|---|---|
| 5,983,348 A | 11/1999 | Ji |
| 7,409,718 B1 | 8/2008 | Hong et al. |
| 7,496,963 B2 | 2/2009 | Shipp |
| 7,568,233 B1 | 7/2009 | Szor et al. |
| 7,649,838 B2 | 1/2010 | Fishteyn et al. |
| 7,664,855 B1 | 2/2010 | Freed et al. |
| 7,779,472 B1 | 8/2010 | Lou |
| 7,870,610 B1 | 1/2011 | Mitchell et al. |
| 7,958,555 B1 | 6/2011 | Chen et al. |

(Continued)

FOREIGN PATENT DOCUMENTS

| | | |
|---|---|---|
| WO | 2012134584 | 10/2012 |
| WO | 2013067505 | 5/2013 |

(Continued)

OTHER PUBLICATIONS

Davidoff et al., "Chapter 12: Malware Forensics," Network Forensics: Tracking Hackers Through Cyberspace, Pearson Education Inc., Jun. 2012, 60 pages.*

(Continued)

*Primary Examiner* — Chau Le
(74) *Attorney, Agent, or Firm* — Van Pelt, Yi & James LLP

(57) ABSTRACT

Detecting malware is disclosed. A candidate malware application is caused to be executed using a virtual machine. Traffic analysis is performed on network traffic associated with the execution of the candidate malware application. A determination is made as to whether the candidate malware application is malicious or not, based at least in part on the traffic analysis and an application type associated with the candidate malware application.

31 Claims, 4 Drawing Sheets

(56) References Cited

U.S. PATENT DOCUMENTS

| | | | |
|---|---|---|---|
| 8,011,010 B2 | 8/2011 | Michael et al. | |
| 8,141,132 B2 | 3/2012 | Oliver et al. | |
| 8,201,246 B1 | 6/2012 | Wu et al. | |
| 8,209,680 B1 | 6/2012 | Le et al. | |
| 8,225,317 B1 | 7/2012 | Chiueh et al. | |
| 8,260,914 B1 | 9/2012 | Ranjan | |
| 8,291,468 B1 | 10/2012 | Chickering | |
| 8,316,440 B1 | 11/2012 | Hsieh et al. | |
| 8,321,936 B1 | 11/2012 | Green et al. | |
| 8,359,651 B1 | 1/2013 | Wu et al. | |
| 8,370,938 B1 | 2/2013 | Daswani et al. | |
| 8,402,543 B1 | 3/2013 | Ranjan et al. | |
| 8,407,324 B2 | 3/2013 | McDougal | |
| 8,438,639 B2 | 5/2013 | Lee et al. | |
| 8,443,363 B1 | 5/2013 | Brennan, III et al. | |
| 8,443,449 B1 | 5/2013 | Fan et al. | |
| 8,464,341 B2 | 6/2013 | Cohen | |
| 8,479,295 B2 | 7/2013 | Sahita et al. | |
| 8,484,732 B1 | 7/2013 | Chen et al. | |
| 8,484,739 B1 | 7/2013 | Seshadri | |
| 8,510,827 B1 | 8/2013 | Leake et al. | |
| 8,516,591 B2 | 8/2013 | Fly et al. | |
| 8,521,667 B2 | 8/2013 | Zhu et al. | |
| 8,539,577 B1 | 9/2013 | Stewart et al. | |
| 8,566,946 B1 | 10/2013 | Aziz | |
| 8,572,740 B2 | 10/2013 | Mashevsky et al. | |
| 8,578,481 B2 | 11/2013 | Rowley | |
| 8,584,239 B2 | 11/2013 | Aziz et al. | |
| 8,646,088 B2 | 2/2014 | Pistoia et al. | |
| 8,656,491 B1 | 2/2014 | Daswani et al. | |
| 8,677,487 B2 | 3/2014 | Balupari et al. | |
| 8,683,584 B1 | 3/2014 | Daswani et al. | |
| 8,707,441 B1 | 4/2014 | Cidambi et al. | |
| 8,756,691 B2 | 6/2014 | Nachenberg | |
| 8,763,125 B1 | 6/2014 | Feng | |
| 8,838,570 B1 | 9/2014 | English | |
| 9,003,526 B2 | 4/2015 | El-Moussa | |
| 2004/0030913 A1 | 2/2004 | Liang et al. | |
| 2004/0107416 A1 | 6/2004 | Buban et al. | |
| 2005/0177602 A1 | 8/2005 | Kaler et al. | |
| 2006/0168024 A1* | 7/2006 | Mehr et al. | 709/206 |
| 2007/0050850 A1 | 3/2007 | Katoh et al. | |
| 2007/0192857 A1 | 8/2007 | Ben-Itzhak | |
| 2007/0261112 A1 | 11/2007 | Todd et al. | |
| 2008/0016552 A1 | 1/2008 | Hart | |
| 2008/0177755 A1 | 7/2008 | Stern et al. | |
| 2008/0177994 A1* | 7/2008 | Mayer | 713/2 |
| 2008/0209562 A1 | 8/2008 | Szor | |
| 2008/0229393 A1 | 9/2008 | Congdon | |
| 2008/0256633 A1 | 10/2008 | Arnold et al. | |
| 2008/0263658 A1 | 10/2008 | Michael et al. | |
| 2008/0263659 A1 | 10/2008 | Alme | |
| 2008/0320594 A1 | 12/2008 | Jiang | |
| 2009/0019547 A1 | 1/2009 | Palliyil et al. | |
| 2009/0055928 A1 | 2/2009 | Kang et al. | |
| 2009/0144826 A2 | 6/2009 | Piccard | |
| 2009/0150419 A1 | 6/2009 | Kim et al. | |
| 2009/0241190 A1 | 9/2009 | Todd et al. | |
| 2009/0282485 A1 | 11/2009 | Bennett | |
| 2009/0288167 A1 | 11/2009 | Freericks et al. | |
| 2010/0043072 A1* | 2/2010 | Rothwell | 726/24 |
| 2010/0077481 A1* | 3/2010 | Polyakov et al. | 726/24 |
| 2010/0107252 A1 | 4/2010 | Mertoguno | |
| 2010/0115586 A1 | 5/2010 | Raghavan et al. | |
| 2010/0154059 A1 | 6/2010 | McNamee et al. | |
| 2010/0162350 A1 | 6/2010 | Jeong et al. | |
| 2010/0175132 A1 | 7/2010 | Zawadowskiy et al. | |
| 2010/0281458 A1 | 11/2010 | Paladino | |
| 2011/0041179 A1 | 2/2011 | St Hlberg | |
| 2011/0055923 A1 | 3/2011 | Thomas | |
| 2011/0090911 A1 | 4/2011 | Hao et al. | |
| 2011/0099620 A1 | 4/2011 | Stavrou et al. | |
| 2011/0167495 A1* | 7/2011 | Antonakakis et al. | 726/24 |
| 2011/0173698 A1 | 7/2011 | Polyakov et al. | |
| 2011/0185425 A1 | 7/2011 | Lee et al. | |
| 2011/0252474 A1* | 10/2011 | Ward et al. | 726/23 |
| 2011/0271342 A1 | 11/2011 | Chung et al. | |
| 2011/0296412 A1 | 12/2011 | Banga et al. | |
| 2011/0296486 A1 | 12/2011 | Burch et al. | |
| 2012/0084860 A1 | 4/2012 | Cao et al. | |
| 2012/0089700 A1 | 4/2012 | Safruti et al. | |
| 2012/0096549 A1 | 4/2012 | Amini et al. | |
| 2012/0117650 A1 | 5/2012 | Nachenberg | |
| 2012/0117652 A1 | 5/2012 | Manni et al. | |
| 2012/0192274 A1 | 7/2012 | Odom et al. | |
| 2012/0233691 A1 | 9/2012 | Jiang | |
| 2012/0240224 A1 | 9/2012 | Payne et al. | |
| 2012/0255018 A1 | 10/2012 | Sallam | |
| 2012/0255019 A1 | 10/2012 | McNamee et al. | |
| 2012/0255021 A1 | 10/2012 | Sallam | |
| 2012/0255031 A1 | 10/2012 | Sallam | |
| 2012/0278889 A1* | 11/2012 | El-Moussa | 726/23 |
| 2012/0291131 A1 | 11/2012 | Turkulainen et al. | |
| 2013/0014259 A1 | 1/2013 | Gribble et al. | |
| 2013/0047147 A1 | 2/2013 | McNeill | |
| 2013/0055394 A1 | 2/2013 | Beresnevichiene et al. | |
| 2013/0091350 A1 | 4/2013 | Gluck | |
| 2013/0091570 A1 | 4/2013 | McCorkendale et al. | |
| 2013/0104230 A1* | 4/2013 | Tang et al. | 726/23 |
| 2013/0145002 A1 | 6/2013 | Kannan et al. | |
| 2013/0145008 A1 | 6/2013 | Kannan et al. | |
| 2013/0152200 A1 | 6/2013 | Alme et al. | |
| 2013/0227165 A1* | 8/2013 | Liu | 709/238 |
| 2013/0246685 A1 | 9/2013 | Bhargava et al. | |
| 2013/0298184 A1* | 11/2013 | Ermagan et al. | 726/1 |
| 2013/0298192 A1 | 11/2013 | Kumar et al. | |
| 2013/0298230 A1 | 11/2013 | Kumar et al. | |
| 2013/0298242 A1 | 11/2013 | Kumar et al. | |
| 2013/0298243 A1 | 11/2013 | Kumar et al. | |
| 2013/0298244 A1 | 11/2013 | Kumar et al. | |
| 2013/0326625 A1 | 12/2013 | Anderson et al. | |
| 2014/0059641 A1* | 2/2014 | Chapman et al. | 726/1 |
| 2014/0096131 A1 | 4/2014 | Sonnek et al. | |
| 2014/0283037 A1 | 9/2014 | Sikorski et al. | |
| 2014/0380474 A1 | 12/2014 | Paithane et al. | |
| 2015/0058984 A1 | 2/2015 | Shen et al. | |

FOREIGN PATENT DOCUMENTS

| | | |
|---|---|---|
| WO | 2013067508 | 5/2013 |
| WO | 2013134206 | 9/2013 |

OTHER PUBLICATIONS

Ligh et al., "Chapter 5: Researching Domains and IP Addresses," Malware Analyst's Cookbook, John Wiley & Sons, 2011, 38 pages.*
van der Heide et al., "DNS Anomaly Detection," System and Network Engineering Research Group, University of Amsterdam, Feb. 6, 2011, 20 pages.*
Abu Rajab et al., "A Multifaceted Approach to Understanding the Botnet Phenonmenon," Proceedings of the 6th ACM SIGCOMM conference on Internet measurement, 2006, 12 pages.*
Schechter et al., "Fast Detection of Scanning Worm Infections," Recent Advances in Intrusion Detection: 7th International Symposium RAID 2004 Proceedings, 2004, 24 pages.*
Sikorski et al., "Chapter 14: Malware-Focused Network Signatures," Practical Malware Anlaysis, No Starch Press, Feb. 2012, 13 pages.*
Chen et al., "Chapter 4: Guarding Against Network Intrusions," Network and System Security, Elsevier Inc., 2009, 5 pages.*
Author Unknown, "FireEye Malware Analysis", FireEye.com, FireEye, Inc., 2010.
Author Unknown, "Hybrid Sandboxing for Detecting and Analyzing Advanced and Unknown Malware", Blue Coat Systems, Inc., 2014.
Lindorfer et al., "Detecting Enviroment-Sensitive Malware", Recent Advances in Intrusion Detection. Springer Berlin Heidelberg, 2011.
Singh et al., "Hot Knives Through Butter: Evading File-based Sandboxes", FireEye, Inc., Feb. 2014.
Author Unknown, "Multi-Vector Virtual Execution (MVX) Engine", FireEye, Inc., http://www.fireeye.com/products-and-solutions/virtual-execution-engine.html, 2014.
Wagener et al., "An Instrumented Analysis of Unknown Software and Malware Driven by Free Libre Open Source Software", Signal Image

(56) References Cited

OTHER PUBLICATIONS

Technology and Internet Based Systems, 2008. SITIS'08. IEEE International Conference on. IEEE, 2008.
Lau et al., "Measuring Virtual Machine Detection in Malware using DSD Tracer", Sophoslabs, Journal in Computer Virology, 2008.
Sun et al. "Malware Virtualization-resistant behavior detection", 2011 IEEE, pp. 912-917.
Zang et al., "Botnet Detection Through Fine Flow Classifcation", CSE Dept. Technical Report No. CSE11-001, p. 1-17, Jan. 31, 2011.
Landecki, Grzegorz, Detecting Botnets, Linux Journal, Jan. 1, 2009.
Karasaridis, Anestis et al., Wide-scale Botnet Detection and Characterization, Dec. 14, 2010.
Author Unknown, Advanced Persistent Threats (APT), What's an APT? A Brief Definition, Damballa, Dec. 14, 2010.
Author Unknown, Executive Overview, The Command Structure of the Aurora Botnet, Damballa, Mar. 2010.
Strayer, W Timothy et al. Detecting Botnets with Tight Command and Control, BBN Technologies, Nov. 2006.
Ramachandran, Anirudh et al., Revealing Botnet Membership Using DNSBL Counter-Intelligence, 2006.
Goebel, Jan et al., Rishi: Identify Bot Contaminated Hosts by IRC Nickname Evaluation, Apr. 2007.
Gu, Guofei et al., BotSniffer: Detecting Botnet Command and Control Channels in Network Traffic, Feb. 2008.
Gu, Guofei et al., BotHunter: Detecting Malware Infection Through IDS-Driven Dialog Correlation, Aug. 2007.
Gu, Guofei et al., BotMiner: Clustering Analysis of Network Traffic for Protocol-and Structure-Independent Botnet Detection, Jul. 2008.
Royal, Paul, Analysis of the Kraken Botnet, Damballa, Apr. 9, 2008.
Livadas, Carl et al., Using Machine Learning Techniques to Identify Botnet Traffic, BBN Technologies, Nov. 2006.
Binkley, James R. et al., An Algorithm for Anomaly-based Botnet Detection, Jul. 2006.
Yen, Ting-Fang et al., Traffic Aggregation for Malware Detection, Jul. 2008.
Author Unknown, Anatomy of a Targeted Attack, Damballa, Dec. 3, 2008.
Author Unknown, Layer 8, How and Why Targeted Attacks Exploit Your Users, Damballa, Nov. 2011.
Author Unknown, Targeted Attacks for Fun and Profit, An Executed Guide to a New and Growing Enterprise Threat, Damballa, Oct. 13, 2008.
Author Unknown, AV, IDS/IPS and Damballa's Response to Targeted Attacks, A Technology Comparison, Damballa, Nov. 2008.
Author Unknown, Updated on the Enemy, A Deconstruction of Who Profits From Botnets, Damballa, May 13, 2009.
Author Unknown, A Day in the Life of a BotArmy, Damballa, 2008.
Ollmann, Gunter, Botnet Communication Topologies, Understanding the Intricacies of Bonet Command and Control, Damballa, 2009.
Ollmann, Gunter, The Botnet vs. Malware Relationship, The One to one Botnet Myth, Damballa, 2009.
Author Unknown, Closed Window, How Failsafe Enhancements Dramatically Limit Opportunities for Malware Armies and other Targeted Attacks, Damballa, Sep. 23, 2009.
Author Unknown, Damballa's In-The-Cloud Security Model, Enterprise Protection Moves Beyond the Network Perimeter, Damballa, Aug. 24, 2008.
Ollmann, Gunter, Extracting CnC from Malware, The Role of malware Sample Analysis in Botnet Detection, Damballa, 2009.
Ollmann, Gunter, The Opt-IN Botnet Generation, Hacktivism and Centrally Controlled Protesting, Social Networks, Damballa, 2010.
Ollmann, Gunter, Serial Variant Evasion Tactics, Techniques Used to Automatically Bypass Antivirus Technologies, Damballa, 2009.
Author Unknown, Damballa: A Different Approach, Targeted Attacks Requires a New Solution, Damballa, Sep. 23, 2008.
Author Unknown, Trust Betrayed, What to Do When a Targeted Attack Turns Your Networks Against You, Damballa, 2008.
Author Unknown, How to Be a Hero in the War Against BotArmies, Damballa, 2008.
Giroire, Frederic et al., Exploiting Temporal Persistence to Detect Convert Botnet Channels, 2009.
Russ White, "High Availability in Routing", Mar. 2004, Cisco Systems, vol. 7, Issue 1, pp. 2-14.
Yadav et al., "Detecting Algorithmically Generated Malicious Domain Names", Nov. 2010.
Dittrich et al., P2P as Botnet Command and Control; A Deeper Insight, 2008 3rd International Conference on Malicious and Unwanted Software (MALWARE), Oct. 2008, IEEE, vol. 10, pp. 41-48.

\* cited by examiner

MALWARE DETECTION BASED ON TRAFFIC ANALYSIS

BACKGROUND OF THE INVENTION

Nefarious individuals attempt to compromise computer systems in a variety of ways. As an example, unsuspecting users may download or otherwise obtain software that purports to be useful (e.g., a game) when in fact, the software contains malicious elements (i.e., is or contains "malware"). Unfortunately, malware authors are crafting increasingly sophisticated malware that is increasingly able to evade detection. Accordingly, there exists an ongoing need for improved techniques to detect malware and prevent its harm.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
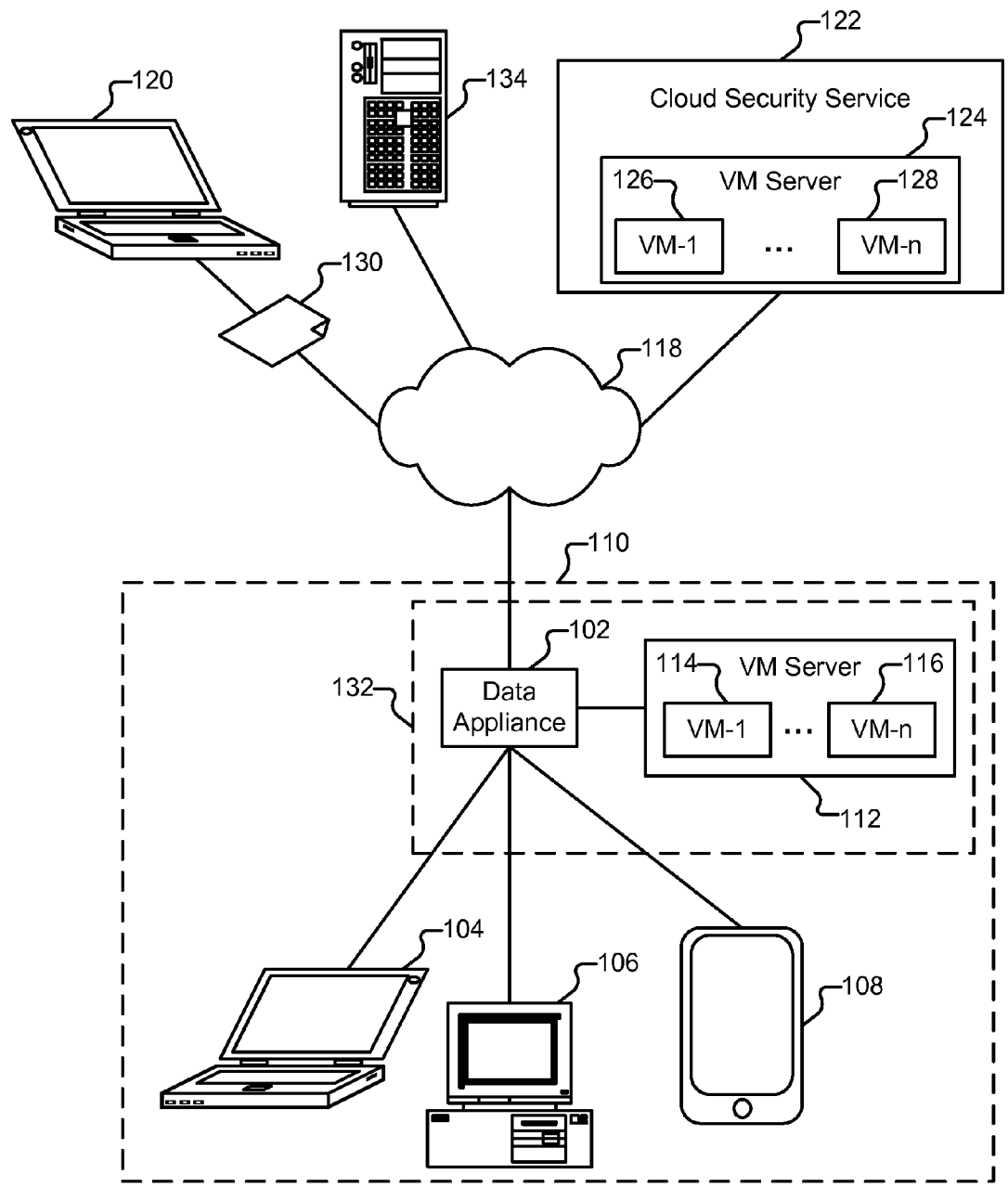
FIG. 1 illustrates an example of an environment in which malware is detected.

FIG. 1 illustrates an example of an environment in which malware is detected. In the example shown in FIG. 1, client devices 104-108 are a laptop computer, a desktop computer, and a tablet (respectively) present in an enterprise network 110. Data appliance 102 is configured to enforce policies 322 regarding communications between clients, such as clients 104 and 106, and nodes outside of enterprise network 110 (e.g., reachable via external network 118). Examples of such policies include ones governing traffic shaping, quality of service, and routing of traffic. Other examples of policies include security policies such as ones requiring the scanning for threats in incoming (and/or outgoing) email attachments, website downloads, files exchanged through instant messaging programs, and/or other file transfers. In some embodiments, appliance 102 is also configured to enforce policies with respect to traffic that stays within enterprise network 110.

Appliance 102 can be configured to work in cooperation with one or more virtual machine servers (112, 124) to perform malware analysis. As one example, data appliance 102 can be configured to provide a copy of malware 130 (transmitted to client 104 by host 120) to one or more of the virtual machine servers for real-time analysis. As another example, service 122 can provide a list of signatures of known-malicious files to appliance 102 as part of a subscription. Those signatures can be generated by service 122 in conjunction with the techniques described herein.

An example of a virtual machine server is a physical machine comprising commercially available server-class hardware (e.g., a multi-core processor, 4+ Gigabytes of RAM, and one or more Gigabit network interface adapters) that runs commercially available virtualization software, such as VMware ESXi, Citrix XenServer, or Microsoft Hyper-V. The virtual machine servers may be separate from, but in communication with, data appliance 102, as shown in FIG. 1. A virtual machine server may also perform some or all of the functions of data appliance 102, and a separate data appliance is omitted as applicable. Further, a virtual machine server may be under the control of the same entity that administers data appliance 102 (e.g., virtual machine server 112); the virtual machine server may also be provided by a third party (e.g., virtual machine server 124, which can be configured to provide services to appliance 102 via third party service 122). In some embodiments, data appliance 102 is configured to use one or the other of virtual machine servers 112 and 124 for malware analysis. In other embodiments, data appliance 102 is configured to use the services of both servers (and/or additional servers not pictured).

A virtual machine (VM) can be used to execute a candidate malware application (e.g., in a VM sandbox environment). Behavior profiling using various heuristic-based analysis techniques and network traffic analysis associated with the application can be performed. As one example, suppose a malicious user of host 120 attempts to send a user of 104 an email message that includes as an attachment a malicious executable (e.g., having a .exe extension). Data appliance 102 can determine whether a signature for the executable is present on data appliance 102. A signature, if present, can indicate that the executable is known to be safe, and can also indicate that the executable is known to be malicious. If no signature for the executable is found, data appliance 102 is configured to provide the executable to a virtual machine server, such as virtual machine server 112, for analysis.

Virtual machine server 112 is configured to execute the executable in one or more virtual machines 114-116. If the executable is ultimately determined to be malicious, appliance 102 can automatically block the file download to client 104 (and any other applicable clients) based on the analysis result. Further, a signature can be generated and distributed (e.g., to other data appliances) to automatically block future file transfer requests to download the file determined to be malicious.

As will be described in more detail below, traffic analysis can be performed on communications associated with the executable and determinations as to whether or not the executable is malicious based, in part, on that traffic analysis. In some embodiments the analysis (also referred to herein as "post-analysis") is performed by the VM server (e.g., VM server 112). In other embodiments, the analysis is performed at least in part by appliance 102. In yet other embodiments, the analysis is performed at least in part by cloud security service 122 (e.g., where virtual machine server 124 is used). The malware analysis functionality illustrated in FIG. 1 as being collectively provided by data appliance 102 and VM server 112 is also referred to herein as being provided by malware analysis system 132. In various embodiments, portions of malware analysis system 132 may be provided by multiple distinct devices, but may also be provided on a single platform, as applicable. Further, in embodiments where virtual machine server 124 and/or cloud security service 122 are used to perform malware analysis, multiple devices may similarly be united into a malware analysis system, as applicable.

Figure 2:
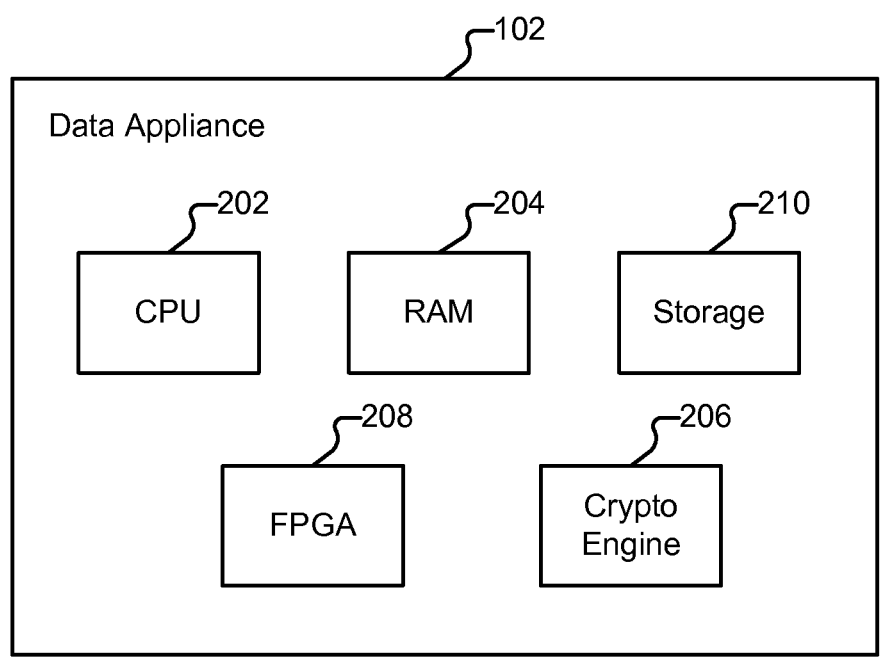
FIG. 2 illustrates an embodiment of a data appliance.

FIG. 2 illustrates an embodiment of a data appliance. The example shown is a representation of physical components that are included in appliance 102, in some embodiments. Specifically, appliance 102 includes a high performance multi-core CPU 202 and RAM 204. Appliance 102 also includes a storage 210 (such as one or more hard disks), which is used to store policy and other configuration information, URL information (e.g., sites visited and domain registration information), and network traffic (e.g., captured with pcap from one or more of the virtual machines). Data appliance 102 can also include one or more optional hardware accelerators. For example, data appliance 102 can include a cryptographic engine 206 configured to perform encryption and decryption operations, and one or more FPGAs 208 configured to perform matching, act as network processors, and/or perform other tasks.

Appliance 102 can take a variety of forms. For example, appliance 102 can be a dedicated device or set of devices. The functionality provided by appliance 102 can also be integrated into or executed as software on a general purpose computer, a computer server, a gateway, and/or a network/routing device. For example, in some embodiments services provided by data appliance 102 are instead (or in addition) provided to client 104 by software executing on client 104.

Whenever appliance 102 is described as performing a task, a single component, a subset of components, or all components of appliance 102 may cooperate to perform the task. Similarly, whenever a component of appliance 102 is described as performing a task, a subcomponent may perform the task and/or the component may perform the task in conjunction with other components. In various embodiments, portions of appliance 102 are provided by one or more third parties. Depending on factors such as the amount of computing resources available to appliance 102, various logical components and/or features of appliance 102 may be omitted and the techniques described herein adapted accordingly. Similarly, additional logical components/features can be added to appliance 102 as applicable.

Figure 3:
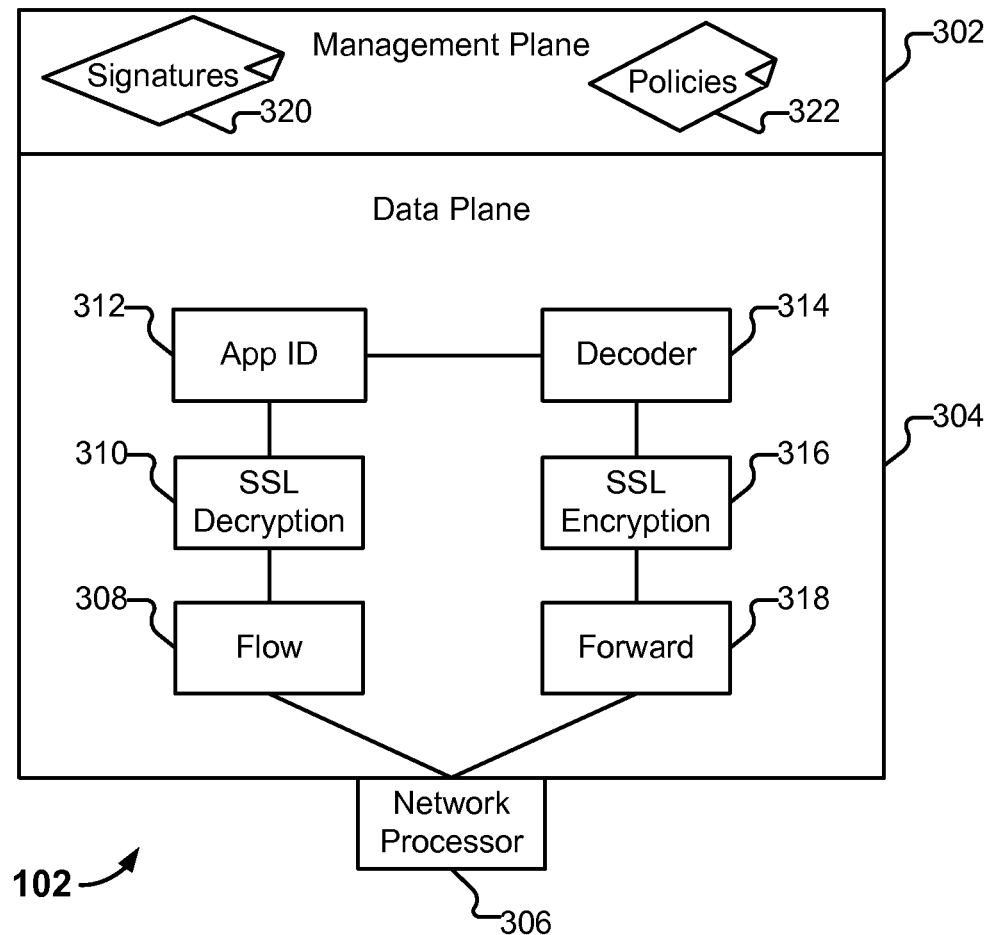
FIG. 3 is a functional diagram of logical components of a data appliance for a malware analysis system in accordance with some embodiments.

FIG. 3 is a functional diagram of logical components of a data appliance for a malware analysis system in accordance with some embodiments. The example shown is a representation of logical components that can be included in data appliance 102. As shown, data appliance 102 includes a management plane 302 and a data plane 304. In some embodiments, the management plane is responsible for managing user interactions, such as by providing a user interface for configuring policies and viewing log data. The data plane is responsible for managing data, such as by performing packet processing and session handling.

Suppose, when executing a copy of candidate malware, virtual machine 114 attempts to access a remote server 134 using an encrypted session protocol, such as SSL. Network processor 306 is configured to receive packets from virtual machine 114, and provide the packets to data plane 304 for processing. Flow 308 identifies the packets as being part of a new session and creates a new session flow. Subsequent packets will be identified as belonging to the session based on a flow lookup. If applicable, SSL decryption is applied by SSL decrypter 310. Otherwise, processing by SSL decrypter 310 is omitted. Application identification module 312 is configured to determine what type of traffic the session involves. For example, application identification module 312 can recognize a GET request in the received data and conclude that the session requires an HTTP decoder. For each type of protocol, there exists a corresponding decoder 314. In some embodiments, the application identification is performed by an application identification module (e.g., APP-ID engine). Based on the determination made by application identification module 312, the packets are sent to an appropriate decoder 314. Decoder 314 is configured to assemble packets (e.g., which may be received out of order) into the correct order, perform tokenization, and extract out information. Also as shown, signatures 320 are received and stored in the management plane 302. As needed, packets are re-encrypted by SSL encryption module 316 and then provided to forward module 318 for transmission to server 134.

Figure 4:
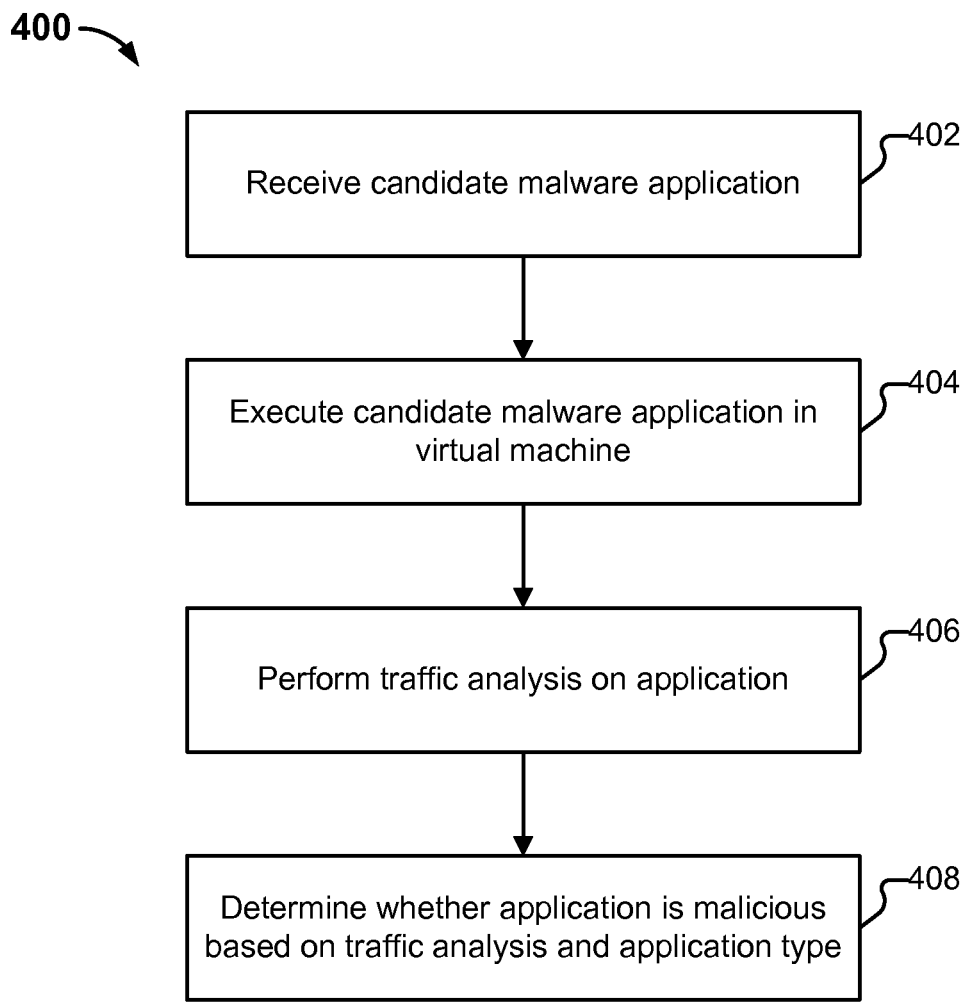
FIG. 4 illustrates an embodiment of a process for detecting malware.

FIG. 4 illustrates an embodiment of a process for detecting malware. In various embodiments, process 400 is performed by malware analysis system 132. The process begins at 402 when a candidate malware application is received. As one example, a candidate malware application is received at 402 when an email (including an attachment) is received by data appliance 102 from host 120. As another example, data appliance 102 can be configured to transmit the attachment to service 122 for analysis. In that scenario, the candidate is received by service 122 at 402.

At 404, the candidate malware application is executed in one or more virtual machines. For example, the candidate malware application can be executed in virtual machine 114. In some embodiments, the virtual machine is configured to include a set of personal user data or other information (e.g., an address book and one or more documents) usable in performing malware analysis. Any network traffic generated as a result of executing the application can be captured (e.g., using pcap) and stored (e.g., in storage 210). As another example, the candidate malware can be executed in virtual machines 126-128 and the network traffic stored by service 122.

At 406, traffic analysis is performed on the captured network traffic. And, at 408, a determination is made as to whether or not the application is malicious based at least in part on the traffic analysis and an application type of the candidate malware application. Additional detail regarding the processing performed at 406 and 408 of process 400 follows.

Suppose the candidate malware application is a screen-sharing utility. The application is executed in a virtual machine (404) and network traffic associated with the execution of the application is captured. Specifically, traffic associated with the virtual machine is parsed by system 132 and application identification module 312 is used to determine that the application is a screen-sharing utility. Other examples of types of applications include (but are not limited to) web browsing applications, FTP applications, email applications, and IRC applications.

When an application is executed in a virtual machine, the application may take certain expected actions (observable via traffic analysis). In the example of the malicious screen-sharing utility, examples of expected actions could include attempting to connect to a known screen-sharing server and/or using a known screen-sharing protocol. An application may also take certain unexpected actions. In the example of the malicious screen-sharing utility, examples of unexpected actions include attempting to transmit a copy of the address book to host 120 and/or attempting to send out emails.

Based on analysis of the collected network traffic, and also based on the type of application (e.g., as determined by module 312), a determination can be made as to whether the application is malicious or not. For example, as a screen-sharing application, establishing a connection to a known screen-sharing site/using a screen-sharing protocol could be considered expected (benign) behavior. For a different type of application (e.g., a word processing application) the same observed traffic (establishing a connection to a known screen-sharing site/using a screen-sharing protocol) could be considered highly suspicious. Similarly, a legitimate screen-sharing application would be very unlikely to need to transmit a user's address book. The fact that the application executing in the virtual machine has attempted to take such an action can be treated as being suspicious accordingly. In this example, no human user is interacting with the application while it is executing in the virtual machine. Thus, even if the application being analyzed was an email client, it should not be sending out emails (i.e., because there is no human drafting an email and clicking on a send button).

In various embodiments, heuristics are applied to determine whether the traffic, in the aggregate, is sufficiently suspicious to indicate that the application is malicious. In some embodiments, traffic analysis of known-good applications is performed and stored as a baseline for comparison against evaluation of unknown applications. If a given application is determined to be suspicious, additional actions can be taken to confirm whether or not the application should be treated as malicious or not. For example, a suspicious application can be quarantined and additional processing can be performed in other virtual machines. Other types of analysis can also be performed, such as static analysis. If a determination is made that an application is malicious (or, in some embodiments, suspicious) appropriate actions can be taken. As one example, a signature for the executable can be generated (e.g., as an MD5 hash-based signature) and stored in data appliance 102 and/or propagated to other data appliances as applicable. As another example, instead of or in addition to generating a signature, an alert can be generated that instructs data appliance 102 not to provide the executable to client 104.

Additional examples of network traffic which, if attributed to a specific application executing in a virtual machine, can be indicative of malware are as follows:

The application communicates or attempts to communicate using the HTTP protocol using a non-standard HTTP port (e.g., using port 1234 instead of port 80).

The application sends or attempts to send non-HTTP traffic over an HTTP port.

The application transmits or attempts to transmit a payload that includes unknown TCP/UDP traffic. This may be indicative, for example, of a custom command and control channel.

The application performs or attempts to perform a host sweep (i.e., is performing network reconnaissance on other machines).

The application connects to or attempts to connect to a recently registered domain.

The application connects to or attempts to connect to a domain name that is not registered.

The application connects to or attempts to connect to an overly long domain. In some embodiments, a threshold is used to define overly long. In other embodiments, the length of the domain is assigned a scaled score.

The application connects to or attempts to connect to a dynamic DNS domain.

The application connects to or attempts to connect to a fast-flux domain.

The application connects to or attempts to connect to a potentially vulnerable port, such as port 135 (RPC) or 445 (SMB), that is typically only exposed inside a network.

The application performs or attempts to perform a DNS query for a mail server (e.g., an MX record).

The application downloads or attempts to download executable files with an incorrect file extension (e.g., attempting to download a file called foo.jpg that is actually an executable, not an image).

The application uses very short HTTP headers (e.g., much shorter than a benign application of the same type).

The application joins or attempts to join an IRC network (and is not an IRC chat application).

The application uses the POST method in HTTP.

The application performs a failed HTTP connection (e.g., an HTTP request was sent by the application, but no response was received).

The application sends out email messages. (Even in the case of a legitimate email client application, a benign email client would not send out email messages without a human taking certain active steps to send the email.)

The application communicates or attempts to communicate using IRC over a non-standard port.

The application engages in intrusion prevention system evasion techniques (e.g., sending an HTTP response before a request has been sent).

The application connects to or attempts to connect to a domain known to host malware.

The application attempts to determine the external IP address of the host on which it is executing (e.g., virtual machine 114) by connecting to an IP address-checking website.

The application connects to or attempts to connect to a free blog, website, or other hosting domain.

The application visits or attempts to visit a domain that belongs to purports to be in one country (e.g., a .ru domain) but has an IP address that is associated with a second country (e.g., a Chinese IP address).

The application uses a direct IP address to connect with a server, rather than a host name.

The application communicates or attempts to communicate new a DNS server (i.e., one that has not yet been configured).

The application transmits or attempts to transmit the virtual machine's IP address.

The application transmits or attempts to transmit the virtual machine's MAC address.

The application uses a non-standard user-agent string in HTTP. The user-agent string may be entirely new (e.g., a sequence of random characters). The user-agent string may also be pre-existing, but suspicious/not correspond to a user-agent string used by a benign application of the same type.

The application performs or attempts to perform a ping scan.

The application communicates or attempts to communicate with a known malicious IP address.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
    a processor configured to:
        receive a representation of network traffic indicative of one or more benign applications executing, wherein each of the one or more benign applications is categorized as having a first predetermined application type that corresponds to at least one type of functionality provided by each of the respective one or more applications, and wherein the one or more benign applications are not malicious applications;
        cause a candidate malware application to be executed using a virtual machine, wherein the candidate malware application has been identified as also having the first predetermined application type, and wherein the candidate malware application is potentially a malicious application;
        perform traffic analysis on network traffic associated with the execution of the candidate malware application; and
        determine that the candidate malware application is a malicious application based at least in part on a comparison of one or more results of the traffic analysis of the candidate malware application and the received representation of network traffic indicative of the one or more benign applications executing; and
    a memory coupled to the processor and configured to provide the processor with instructions.

2. The system of claim 1 wherein performing the traffic analysis includes receiving a log of recorded traffic.

3. The system of claim 1 wherein determining that the candidate malware application is a malicious application includes determining that the candidate malware application has connected to a non-standard HTTP port.

4. The system of claim 1 wherein determining that the candidate malware application is a malicious application includes determining whether the candidate malware application has performed a host sweep.

5. The system of claim 1 wherein determining that the candidate malware application is a malicious application includes determining whether the candidate malware application has transmitted unknown TCP or UDP traffic.

6. The system of claim 1 wherein determining that the candidate malware application is a malicious application includes determining whether the candidate malware application has attempted to visit an unregistered domain.

7. The system of claim 1 wherein determining that the candidate application is a malicious application includes determining whether the candidate malware application has attempted to connect to a vulnerable port.

8. The system of claim 1 wherein determining that the candidate malware application is a malicious application includes determining whether the candidate malware application has performed a DNS query for a mail server.

9. The system of claim 1 wherein determining that the candidate malware application is a malicious application includes determining whether the candidate malware application has downloaded an executable file with an incorrect file extension.

10. The system of claim 1 wherein determining that the candidate malware application is a malicious application includes determining whether the candidate malware application has used an HTTP header that is shorter than a benign application having the predetermined first application type.

11. The system of claim 1 wherein determining that the candidate malware application is a malicious application includes determining whether the candidate malware application has joined an IRC network.

12. The system of claim 1 wherein determining that the candidate malware application is a malicious application includes determining whether the candidate malware application has performed a failed HTTP connection.

13. The system of claim 1 wherein determining that the candidate malware application is a malicious application includes determining whether the candidate malware application has sent an email message.

14. The system of claim 1 wherein determining that the candidate malware application is a malicious application includes determining whether the candidate malware application has communicated using IRC over a non-standard port.

15. The system of claim 1 wherein determining that the candidate malware application is a malicious application includes determining whether the candidate malware application has produced unknown traffic over a standard HTTP port.

16. The system of claim 1 wherein determining that the candidate malware application is a malicious application includes determining whether the candidate malware application has used an intrusion prevention evasion technique.

17. The system of claim 1 wherein determining that the candidate malware application is a malicious application includes determining whether the candidate malware application has visited a long domain, wherein the determination is based at least in part on at least one of (1) a comparison of a domain length to a threshold, and (2) a scaled score assigned based on the domain length.

18. The system of claim 1 wherein determining that the candidate malware application is a malicious application includes determining whether the candidate malware application has visited a known dynamic DNS domain.

19. The system of claim 1 wherein determining that the candidate malware application is a malicious application includes determining whether the candidate malware application has visited a fast-flux domain.

20. The system of claim 1 wherein determining that the candidate malware application is a malicious application includes determining whether the candidate malware application has visited a recently registered domain.

21. The system of claim 1 wherein determining that the candidate application is a malicious application includes determining whether the candidate malware application has visited a known malicious domain.

22. The system of claim 1 wherein determining that the candidate malware application is a malicious application includes determining whether the candidate application has attempted to identify an external IP address of the system by using an IP-address checking website.

23. The system of claim 1 wherein determining that the candidate malware application is a malicious application includes determining whether the candidate application has attempted to connect to a free web-hosting domain.

24. The system of claim 1 wherein determining that the candidate malware application is a malicious application includes determining whether the candidate malware application has attempted to connect to a domain associated with a first country at an IP address that is associated with a second country.

25. The system of claim 1 wherein determining that the candidate malware application is a malicious application includes determining whether the candidate malware application has attempted to connect to a server using an IP address instead of a host name.

26. The system of claim 1 wherein determining that the candidate malware application is a malicious application includes determining whether the candidate malware application attempts to communicate with a newly available DNS server.

27. The system of claim 1 wherein determining that the candidate malware application is a malicious application includes determining whether the candidate malware application attempts to transmit an IP address or MAC address of the virtual machine.

28. The system of claim 1 wherein determining that the candidate malware application is a malicious application includes determining what user-agent string is used by the candidate malware application.

29. The system of claim 1 wherein determining that the candidate malware application is a malicious application includes determining whether the candidate malware application attempts to perform a ping scan.

30. A method, comprising:
receiving a representation of network traffic indicative of one or more benign applications executing, wherein each of the one or more benign applications is categorized as having a first predetermined application type that corresponds to at least one type of functionality provided by each of the respective one or more applications, and wherein the one or more benign applications are not malicious applications;
causing a candidate malware application to be executed in a virtual machine, wherein the candidate malware application has been identified as also having the first predetermined application type, and wherein the candidate malware application is potentially a malicious application;
performing, by one or more processors, traffic analysis on network traffic associated with the execution of the candidate malware application; and
determining, by the one or more processors, that the candidate malware application is a malicious application based at least in part on a comparison of one or more results of the traffic analysis of the candidate malware application and the received representation of network traffic indicative of the one or more benign applications executing.

31. A computer program product embodied in a non-transitory tangible computer readable storage medium and comprising computer instructions for:
receiving a representation of network traffic indicative of one or more benign applications executing, wherein each of the one or more benign applications is categorized as having a first predetermined application type that corresponds to at least one type of functionality provided by each of the respective one or more applications, and wherein the one or more benign applications are not malicious applications;
causing a candidate malware application to be executed in a virtual machine, wherein the candidate malware application has been identified as also having the first predetermined application type, and wherein the candidate malware application is potentially a malicious application;
performing traffic analysis on network traffic associated with the execution of the candidate malware application; and
determining that the candidate malware application is a malicious application based at least in part on a comparison of one or more results of the traffic analysis of the candidate malware application and the received representation of network traffic indicative of the one or more benign applications executing.

* * * * *